(12) United States Patent
Jones et al.

(10) Patent No.: US 10,140,624 B2
(45) Date of Patent: Nov. 27, 2018

(54) SYSTEMS AND METHODS FOR USE IN FORECASTING CHANGES IN SALES

(71) Applicant: Walmart Apollo, LLC, Bentonville, AR (US)

(72) Inventors: Nicholaus A. Jones, Fayetteville, AR (US); Aaron J. Vasgaard, Rogers, AR (US); Matthew A. Jones, Bentonville, AR (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/492,499

(22) Filed: Apr. 20, 2017

(65) Prior Publication Data

US 2017/0308914 A1    Oct. 26, 2017

Related U.S. Application Data

(60) Provisional application No. 62/325,139, filed on Apr. 20, 2016.

(51) Int. Cl.
*G06Q 10/00* (2012.01)
*G06Q 30/02* (2012.01)
*G06Q 10/08* (2012.01)

(52) U.S. Cl.
CPC ....... *G06Q 30/0202* (2013.01); *G06Q 10/087* (2013.01)

(58) Field of Classification Search
CPC ...... G06Q 10/02; G06Q 10/087; G06Q 30/02; G06Q 30/0202
See application file for complete search history.

(56) References Cited

U.S. PATENT DOCUMENTS 8,392,228 B2    3/2013   Mulukutla
8,751,330 B2    6/2014   Malsbenden
(Continued)

FOREIGN PATENT DOCUMENTS

CA    2267399    9/2000

OTHER PUBLICATIONS

PCT; App. No. PCT/US2017/028268; International Search Report and Written Opinion dated Jul. 18, 2017.
(Continued)

*Primary Examiner* — William S Brockington, III
(74) *Attorney, Agent, or Firm* — Fitch, Even, Tabin & Flannery LLP

(57) ABSTRACT

In some embodiments, apparatuses and methods are provided to forecast expected sales and/or demand for one or more products at one or more retail shopping facilities. Some embodiments include systems to forecast retail sales, comprising: a network transceiver; a forecast control circuit; and a memory storing computer instructions executed by the control circuit that receives, via the network transceiver from at least one third party service unassociated with retail shopping facilities and accessed over a distributed computer network, reservation data corresponding with people traveling during a future period of time to a geographic region that is within a threshold distance from a first retail shopping facility; and forecasts expected sales, during the future period of time associated with the reservation data, of at least a first set of products at the first retail shopping facility as a function of the reservation data.

17 Claims, 2 Drawing Sheets

(56) References Cited

U.S. PATENT DOCUMENTS

| | | | | |
|---|---|---|---|---|
| 2004/0260599 A1* | 12/2004 | Ziegele | ............... | G06Q 30/02 |
| | | | | 705/7.31 |
| 2005/0033616 A1* | 2/2005 | Vavul | ............... | G06Q 10/02 |
| | | | | 705/5 |
| 2006/0095329 A1 | 5/2006 | Kim | | |
| 2012/0209661 A1 | 8/2012 | Bennett | | |
| 2013/0080922 A1* | 3/2013 | Elias | ............... | G06Q 50/01 |
| | | | | 715/753 |
| 2014/0156401 A1 | 6/2014 | Carr | | |
| 2014/0279200 A1* | 9/2014 | Hosein | ............... | G06Q 30/0601 |
| | | | | 705/26.7 |
| 2017/0169446 A1 | 6/2017 | Li | | |

OTHER PUBLICATIONS

Rabe, Mark; "How Predictive Analytics is Reshaping the Travel Industry"; http://insights.wired.com/profiles/blogs/howpredictiveanalyticsisreshapingthetravelindustry#axzz3yRMdLmsU; Feb. 20, 2015; 5 pages.

Tigu, Gabriela and Calaretu, Bogdan; "Supply Chain Management Performance in Tourism Continental Hotels Chain Case"; The Bucharest University of Economic Studies, Romania; vol. 15, No. 33; Feb. 2013; pp. 103-115.

U.S. Department of Transportation Federal Highway Administration; "Managing Demand Through Travel Information Services"; http://ops.fhwa.dot.gov/publication/manag_demand_tis/travelinfo.htm; Retrieved on Jan. 29, 2016; 32 pages.

* cited by examiner

SYSTEMS AND METHODS FOR USE IN FORECASTING CHANGES IN SALES

CROSS-REFERENCE TO RELATED APPLICATION

This application claims the benefit of U.S. Provisional Application No. 62/325,139, filed Apr. 20, 2016, which is incorporated herein by reference in its entirety.

TECHNICAL FIELD

This invention relates generally to retail sales.

BACKGROUND

In a modern retail environment, there is a need to improve the customer service and/or convenience for the customer. One aspect of customer service is having products on-hand at the retail shopping facilities. Lost sales can result when insufficient products are available. Often products are distributed to retail shopping facilities through product distribution and/or fulfillment centers.

BRIEF DESCRIPTION OF THE DRAWINGS

Disclosed herein are embodiments of systems, apparatuses and methods pertaining forecasting demands of products as retail shopping facilities. This description includes drawings, wherein.

Figure 1:
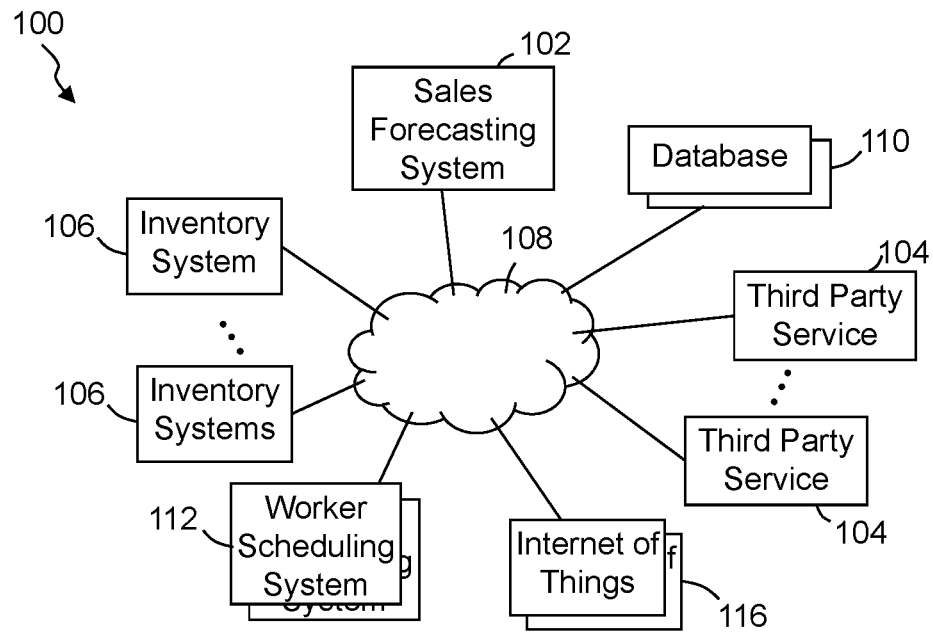
FIG. 1 illustrates a simplified block diagram of an exemplary system to forecast retail sales of one or more products at one or more shopping facilities, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein to forecast retail sales of one or more products at one or more shopping facilities. Some embodiments provide systems that include a network transceiver coupled to communicate over a distributed computer network, and a forecast control circuit. The forecast control circuit receives reservation data from one or more third party services that are unassociated with retail shopping facilities and accessed over the distributed computer network. The reservation data corresponds with people traveling during a future period of time to a geographic region that is within a threshold distance from one or more retail shopping facilities. The forecast control circuit forecasts expected sales, during the future period of time associated with the reservation data, of at least a first set of products at one or more retail shopping facilities as a function of the reservation data.

The inventors have identified that forecasting of future sales can be difficult and many different factors can affect such future sales. It was further identified that such factors can include sales based on customers' activities, including travel. Other sales forecastings fail to take into consideration the effects of sales as a function of knowledge of potential customers' travels and other relevant activities. Many previous sales forecasting is limited to historic sales. The inventors, however, identified that historic sales can provide some information but more accurate forecasting can be obtained for at least some products and/or with respect to some times of the year by further taking into consideration potential customers' anticipated travel activities and/or other activities relative to one or more specific geographic areas. By utilizing unconventional rules applied unconventionally to at least travel and/or reservation data, the present embodiments can provide improved future forecasting of sales relative to one or more particular shopping facilities within a geographic area corresponding to expected travel and/or reservation data. Previous forecasting failed to consider such data, and failed to apply relevant rules to improve forecasting based on such data.

FIG. 1 illustrates a simplified block diagram of an exemplary system 100 to forecast retail sales of one or more products at one or more shopping facilities, in accordance with some embodiments. The system includes one or more sales forecasting systems 102, one or more third party services 104, and an inventory system 106 for each of one or more retail shopping facilities. The forecasting system 102 is in communication with the third party services 104 and inventory systems through one or more distributed computer and/or communication networks 108, such as WAN, LAN, Internet, and/or other such networks that provide wired and/or wireless communication. The system typically further includes one or more databases 110, which are part of and/or accessible to one or more of the sales forecasting system 102, the third party services 104, the inventory systems, or other systems. Some embodiments further include one or more worker scheduling circuits or systems 112, which can be associated with one or more of the shopping facilities.

In some embodiments, the system 100 includes and/or is in communication with one or more so-called Internet of Things (IOT) 116 (such as smart phones, tablets, smart TVs, computers, laptops, and so forth). In some instances, the Internet of Things may include network edge elements (i.e., network elements deployed at the edge of a network). In some case a network edge element is configured to be personally carried by a person. Examples include but are not limited to so-called smart phones, tablets, smart wearable devices (e.g., smart watches, fitness monitors that are worn on the body, etc.). In other cases, the network edge element may be configured to not be personally carried by a person, such as but not limited to smart refrigerators and pantries, entertainment and information platforms, exercise and sporting equipment, digital personal assistant (e.g., home and/or office digital assistances such as Amazon Alexa implemented on an Amazon Echo, Google Assistant implemented on a Google Home, etc.), and other such devices. This can occur when, for example, the network edge element is too large and/or too heavy to be reasonably carried by an ordinary average person, or not configured to easy transport. This can also occur when, for example, the network edge element has operating requirements ill-suited to the mobile environment that typifies the average person.

In some embodiments, one or more third party services 104 receive and/or track reservation data corresponding to the people traveling during a future period of time and typically to locations away from their homes. The reservation data can include reservations for hotel rooms, car rentals, airline tickets, amusement parks, tour packages, and other such reservations that are often associated with people traveling. Further, the reservation data can include actual purchases by some people (e.g., purchases of airline tickets, events, etc.). The third party services may be a service that allows the customers to make reservations for a particular company (e.g., a particular hotel, a particular airline, a particular train carrier, car rental company, etc.) or various other companies (e.g., a reservation intermediary allowing customers to view available flight information for one or more airlines and/or purchase airline tickets, an intermediary allowing customers to view available hotel room information for one or more hotels and reserve a hotel room, an intermediary allowing customers to rent cars, etc.). The third party service may additionally or alternatively be a service that collects reservation data from other entities (e.g., from hotels, airlines, train lines, cruise ships, car rental agencies, etc.). The reservation data may be accessed through the various third party services 104 and/or through one or more databases 110. Additionally or alternatively, other travel and/or reservation data may be obtained through one or more Internet of Things 116. For example, a home digital assistant may detect and/or track requests for travel data, identification of intended destinations based on queries and/or discussions, reservation data obtained through the digital assistant, and the like. Similarly, some information may be collected by software Applications (APPs) implemented on Internet of Things 116, such as reservation data obtained through the Internet of Thing, reservation confirmation data received and/or accessed through an Internet of Thing, purchase data corresponding with anticipated sales, Internet search queries, and/or other such data. Such data can be used to anticipate and/or confirm a customer's future travel. In some applications, an application may autonomously collect and communicate such information, while in other instances, an application may communicate relevant information in response to a request or query from the forecasting system 102. Further, the one or more software applications may operate on the Internet of Thing to implement some of the processing of the travel and/or reservation data.

The sales forecasting system 102 accesses the reservation data and/or other travel data (e.g., obtained through one or more Internet of Things 116), and uses the data as at least part of the information in forecasting quantities of sales of one or more products and/or how sales are likely to change based on the reservation data and/or changes or variations in the reservation data. Further, in some instances, the forecasting system 102 uses short term changes in reservation data to further forecast sales, adjust inventory at one or more shopping facilities and/or distribution centers, and/or adjust future orders for products. In some embodiments, the forecasting system additionally tracks expected changes in reservation data and/or dates corresponding to reservation data in forecasting changes in product purchasing patterns at one or more shopping facilities. For example, a significant decrease in hotel reservations at or near the end of August and September can indicate a change from summer to fall and/or can be used to forecast the change from summer to fall and the expected change in purchasing patterns. Based at least in part on the forecasted change in seasons, the inventory systems 106 can predict changes in purchasing patterns, forecast sales of products, and adjust inventory at one or more shopping facilities to correspond to the change, the forecasted change in product purchasing patterns, and forecasted sales. For example, in response to decrease in hotel reservations in an area that is at or close to the beach, an inventory system can reduce inventory of pool and beach toys, and increase inventory of heavier clothing. Accordingly, the forecasting system 102 uses the reservation data to forecast changes in sales and/or forecasts quantities of sales of products.

In some applications, the forecasting system in applying rules can utilize additional information in forecasting the sales. This can include sales data from other related stores, rates of sales in other geographic areas, predicted sales based on other factors (e.g., changes in pricing, historic sales, changes in customer demands, changes in customer demographics, etc.) historic methods of forecasting demand, and/or other such information. Thus, in some embodiments, the forecasting system 102 uses the reservation data as some of the information used in forecasting demand and/or expected sales of one or more products. Further, the forecasting system may use the reservation data to adjust other forecasted demands and/or expected sales. This adjustment may be specific to a particular product or set of products that are relevant to a geographic area and/or a time of year, relevant to a particular shopping facility or cluster of shopping facilities, or the like.

Further, in some applications, the sales forecasting system accesses and/or receives travel data from multiple different and geographically distributed Internet of Things 116. One or more rules can be applied to anticipate travel by a corresponding potential customer to one or more geographic locations. Further, one or more rules can be applied to associate at least some of the travel data with a geographic location corresponding to a particular retail shopping facility or group of two or more retail shopping facilities. The rules can, for example, identify a geographic region corresponding to travel data, and identify a shopping facility within the geographic region or within a threshold distance of the geographic region. Such rules may, for example, consider historic reservation and/or travel data and corresponding purchases by customers associated with those historic travel data at one or more distances within or from the geographic area. Further, the sales forecasting system in forecasting the expected sales forecasts of one or more products at a retail shopping facility can forecast as a function of the reservation data and the travel data received from the Internet of Things 116 and corresponding to the geographic location of the shopping facility.

Figure 2:
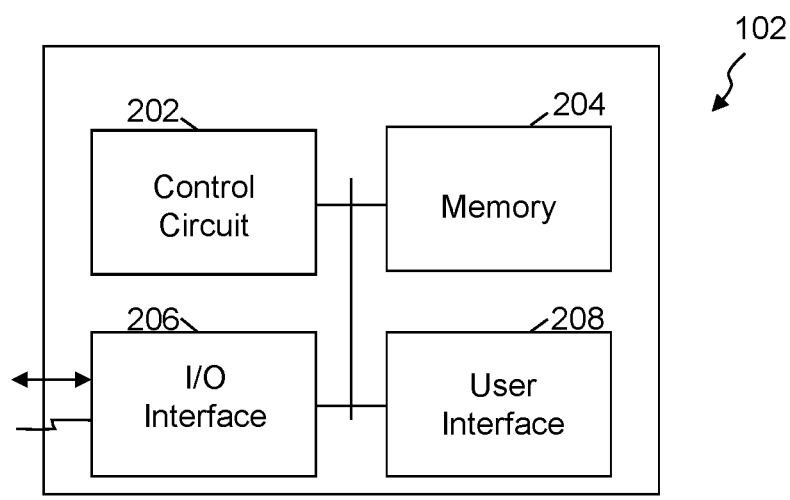
FIG. 2 illustrates a simplified block diagram of an exemplary sales forecasting system, in accordance with some embodiments.

FIG. 2 illustrates a simplified block diagram of an exemplary sales forecasting system 102, in accordance with some embodiments. The sales forecasting system 102 includes one or more forecast control circuits 202, memory 204, and input/output (I/O) interfaces and/or devices 206. Some embodiments further include one or more user interfaces 208. The forecast control circuit 202 typically comprises one or more processors and/or microprocessors. The memory 204 stores the operational code or set of instructions that is executed by the forecast control circuit 202 and/or processor to implement the functionality of the sales forecasting system 102. In some embodiments, the memory 204 may also store some or all of particular data that may be used to evaluate reservation data, track reservation data, track and/or identify variations in reservation data, forecast changes in purchasing patterns, forecast product sales, and/or make other associations, determinations, measurements and/or communications described herein. Such data may be pre-stored in the memory 204, received from an external source, be determined, and/or communicated to the sales forecasting system.

It is understood that the forecast control circuit 202 and/or processor may be implemented as one or more processor devices as are well known in the art. Further, in some instances, the control circuit 202 may be implemented through multiple processors distributed over one or more computer networks. Similarly, the memory 204 may be implemented as one or more memory devices as are well known in the art, such as one or more processor readable and/or computer readable media and can include volatile and/or nonvolatile media, such as RAM, ROM, EEPROM, flash memory and/or other memory technology. Although the memory 204 is shown as internal to the sales forecasting system 102, the memory 204 can be internal, external or a combination of internal and external memory. While FIG. 2 illustrates the various components being coupled together via a bus, it is understood that the various components may actually be coupled to the control circuit 202 and/or one or more other components directly.

Further, the control circuit 202 and/or electronic components of the sales forecasting system 102 can comprise fixed-purpose hard-wired platforms or can comprise a partially or wholly programmable platform. These architectural options are well known and understood in the art and require no further description here. The sales forecasting system and/or control circuit 202 can be configured (for example, by using corresponding programming as will be well understood by those skilled in the art) to carry out one or more of the steps, actions, and/or functions described herein. In some implementations, the control circuit 202 and the memory 204 may be integrated together, such as in a microcontroller, application specification integrated circuit, field programmable gate array or other such device, or may be separate devices coupled together.

The I/O interface 206 allows wired and/or wireless communication coupling of the sales forecasting system 102 to external components, such as the third party services 104, inventory systems 106, databases 110, worker scheduling systems 112, marketing services and/or systems, distribution centers, and other such devices or systems. Typically, the I/O interface 206 provides wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some implementations, the sales forecasting system includes one or more user interfaces 208 that may be used for user input and/or output display. For example, the user interface 208 may include any known input devices, such as one or more buttons, knobs, selectors, switches, keys, touch input surfaces, audio input, and/or displays, etc. Additionally, the user interface 208 include one or more output display devices, such as lights, visual indicators, display screens, etc. to convey information to a user/worker, such as but not limited to reservation trends, reservation data, sales data, inventory information, forecasted sales, forecasted changes in purchasing patterns, product orders, product information, shipping information, product location information, worker information, status information, communication information (e.g., text messages, emails, etc.), mapping information, operating status information, notifications, errors, conditions, and/or other such information. Similarly, the user interface 208 in some embodiments may include audio systems that can receive audio commands or requests verbally issued by a worker, and/or output audio content, alerts and the like.

The sales forecasting system 102 is configured to access the reservation data from one or more third party services 104 and/or databases 110, and use this information to forecast sales of products and/or forecast changes in purchasing patterns. In some embodiments, the forecasting system receives and/or accesses, via the network 108 from at least one third party service unassociated with retail shopping facilities, reservation data corresponding with people traveling during a future period of time. Additionally or alternatively, a retail facility or a chain of retail facilities may provide travel services and enable customers to access travel information and make travel reservations through the travel service provided by the retail facility or chain. Typically, the forecasting system forecasts sales and/or changes in sales for one or more shopping facilities within a limited geographic region. As such, the reservation data accessed by the forecasting system may be limited to reservation data corresponding to a geographic region that is within a threshold distance from the one or more retail shopping facilities for which the forecasting system is attempting to forecast sales. For example, when forecasting sales for a particular shopping facility that is located near a popular tourist beach, the forecasting system may limit hotel reservation data to reservations at hotels that are within a threshold distance from that retail facility. The threshold distance may be determined over time based on historic sales, tracking customer purchases relative to hotel reservation data corresponding to those customers, and other such information. The sales forecasting system 102 can additionally or alternatively access other relevant reservation data, travel data, purchase data, and other such data obtained through one or more Internet of Things. Similarly, the sales forecasting system may utilize additional reservation data, travel data, purchase data and the like from Internet of Things 116 to confirm reservation data from one or more other sources and/or confirm changes to reservation data. For example, purchase data received from Internet of Things that are consistent with expected travel can be used as confirmation of future travel (e.g., purchase of new swimsuit can correspond to expected travel to a beach area).

Again, the forecasting system typically attempts to forecast future sales so that inventory can be adjusted in accordance with the forecasted future sales. As such, the forecasting system typically further evaluates reservation data for reservations at times in the future. How far into the future can depend on the type of product or products being forecasted, the forecasted rate of change in sales, detected rates of change in reservation data, other such factors, and typically a combination of two or more of such factors. For example, the forecasting may be a forecasting in the near future (e.g., less than a week) due to detecting a significant increase in reservation cancellations (e.g., cancellations due to expected changes in weather, such as a forecasted hurricane, at beach areas). As another example, the forecasting may be forecasting for one or more months in the future (e.g., in forecasting a change in seasons). Further, the forecasting system can continue to track and evaluate the reservation data over time to make adjustments to previous sales forecasts. Again, for example, changes and/or forecasted changes in weather may cause adjustments over the next few days to forecasted sales that were forecasted using the reservation data one or more times in the past.

The forecasting system can apply one or more rules to forecast, as a function of the reservation data and/or other data, expected sales of one or more products during the future period of time associated with the reservation data. The rules, in some implementations, applied in the forecasting of sales for the one or more products may limit the forecasting to one or more retail shopping facilities that correspond to a geographic location being considered. The rules may take into consideration a location of the reservation and distances to known activities and/or attractions within one or more threshold distances and/or travel times relative to the reservation location. Further, the size of the geographic area may vary depending on the product being forecasted, the time of year, and other such factors. Often, however, the sales forecasting is performed for a single product at a single shopping facility. The forecasting can be repeated for each of multiple different products at that single shopping facility, and further repeated for each relevant product at each other shopping facility being considered. In some embodiments, the forecasting system maintains an array, matrix, database, spreadsheet and/or other such association system that associates products and/or product characteristics with reservation data, weather conditions, season information, calendar information, event information, geographic information, and/or other such factors. For example, a product array may associate beach toys with calendar data (e.g., expected sales increase during summer), predicted and/or forecasted warm weather, geographies that are within threshold distances of beaches, other such factors, and typically a combination of two or more such factors. Further, in some instances, weightings can be applied to the different factors that historically correspond to changes in sales. For example, geographic information and calendar data may be given greater weight than forecasted weather data for some products, while weather data may be given greater weight than geographic information for other products. Similarly, weightings may be associated with timing information (e.g., short term sales of some products may having greater weightings corresponding to weather data). The forecasting system can use the product array in determining and/or adjusting forecasted sales of products. The forecasting system uses the change in reservation data and/or rates of change in reservation data to provide reactionary changes in forecasted sales over short durations, as well as longer term durations.

In some embodiments, the forecasting system in forecasting the expected sales applies one or more rules to determine the forecasted sales as a function of historic data (e.g., actual sales) and corresponding historic reservation data. The forecasting system can evaluate historic reservation data and/or actual usage data (e.g., actual occupancy data, actual flights taken, etc.) to identify periods of time in the past that had historic reservation data that is consistent with reservation data of the future period of time for which expected sales are being forecasted. When one or more periods of time are identified as having historic reservation data consistent with future reservation data, actual historic sales data for those one or more periods of time can be evaluated relative to one or more products of interest as used as at least part of the forecasted sales. In some instances, the forecasted sales may be forecasted as an average of the historic actual sales over one or more different periods of time (e.g., a particular week over multiple years, over multiple weeks a preceding year, etc.), while in other implementations, recent trends in sales of a product may further be taken into account to adjust the historic actual sales to specify a forecasted sales. For example, one or more rules can be applied to detect when sales trends of a particular product show that sales of that product are decreasing, and the forecasting system may proportionally reduce the historic actual sales of that product in specifying a forecasted sales of that product. Similarly, some embodiments evaluate trends and/or actual sales of similar and/or corresponding products, particularly when there is limited sales data of a particular product (e.g., relatively recently released product). Reservation data can be tracked over time to start seeing travel patterns as people start making reservations and/or make travel related purchases (e.g., airline tickets, etc.). For example, months before a period of time the quantities of sales of one or more products are to be forecasted, the forecasting system can identify travel patterns and start predicting expected sales, which can be used in ordering products. However, as the current time is closer to the period for which the forecasting system is forecasting, the reservation data typically provides more accuracy in the forecasting.

Some embodiments further apply rules to create clusters of shopping facilities based on reservation data in a geographic region. The forecasting system can define a cluster of multiple retail shopping facilities that are within a predefined geographic region that includes multiple specific locations specifically associated with a subset of the reservation data, and forecasts expected sales for each of the multiple retail shopping facilities of the cluster as a function of the subset of the reservation data corresponding to the specific locations. The forecasting system can associate multiple shopping facilities based on one or more factors, such as geographic area in which they are located, similar sales data, other such associations. Based on the association, the system can define a cluster of multiple shopping facilities. Reservation data corresponding to the geographic area in which the multiple shopping facilities are located and/or are within a threshold distance of can be used in forecasting for each of the multiple shopping locations. In some instances, a single forecasting of a product is applied to each of the multiple shopping facilities of the cluster, while in other instances, independent forecasting is performed for the product for each shopping facility while using the same reservation data based on geographic area for each of the clustered shopping facilities.

Some embodiments may define clustering based on other associations of multiple shopping facilities based on one or more factors, such as geographic area in which they are located, similar weather conditions, similar sales data, other such associations, and often based on two or more of such associations. One or more subsets of the reservation data can be determined based on the clustering and the forecasting for sales of one or more products determined based on the one or more subsets of the reservation data.

As described above, in some embodiments, the forecasting system 102 can predict an end to a season as a function of the reservation data. For example, reservation data is expected to increase for certain products in at least certain geographic areas as summer approaches. Accordingly, the forecasting system can forecast the change between a retail spring season and a retail summer season. Similarly, at least hotel reservations in some geographic areas are expected to decrease as summer ends (e.g., beach areas). Using the reservation data the forecasting system can predict the end of the retail summer season (e.g., hotel reservations dropping below one or more threshold levels in a geographic area). In some implementations, the forecasting system evaluates historic reservation data relative to changes in sales to identify relationships between reservation data and changes in retail seasons and/or product sales.

Based on the forecasted end of season, the forecasting system can cause changes in inventory ordering for the one or more shopping facilities being forecasted. For example, the forecasting system can notify one or more inventory systems with instructions regarding how to adjust inventory. This adjustments can be based on forecasted sales, historic changes in sales corresponding to the change in season, time until the predicted change, expected rate of change in purchase patterns, other such factors or a combination of two or more of such factors. In other instances, the forecasting system notifies the one or more inventory systems of the predicted change in season, and the inventory can determine adjustments to inventory of one or more products based on one or more of the above factors and/or other factors.

In some embodiments the inventory systems 106 includes a control circuit and memory storing executable code implemented by the control circuit. The inventory system can further store (e.g., in memory) and/or access inventory information of available inventory of one or more retail shopping facilities and/or distribution centers. The inventory system can be configured to adjust orders of one or a set of products as a function of the expected sales of the one or set of products and the inventory information corresponding to the one or set of products. Similarly, the inventory system associated with a distribution center can adjust orders from one or more product suppliers based on expected sales.

Similarly, in some embodiments, one or more inventory systems 106 may store and/or access inventory information of an inventory of products for sale at one or more retail shopping facilities, and modify a sales strategy of one or more products based on the forecasted expected sales and the inventory information corresponding to at least the one or more products. For example, the forecasting system 102 and/or the inventory system 106 may cause one or more products to be reduced in price, moved to a more prominent location within a shopping facility, advertised or emphasized in advertisements, communications sent to one or more customers highlighting one or more products (e.g., ground mail, text message, through an APP, etc.), and/or other such modifications to sales strategies. Similarly, a marketing strategy may be developed for one or more and/or a set of products based on a predicted changes in sales as a result of identified changes (e.g., reductions, increases, etc.) in reservation data. The marketing strategy may, for example, initially increase exposure of the one or more products of a first future period of time, schedule the prices to be reduced on the one or more products over a subsequent second future period of time, then place the remaining items of the one or more products on clearance (e.g., further reduced pricing with placement in a clearance area) during a subsequent third future period of time based on changes in reservation data corresponding to one or more of the first, second, third and/or subsequent future periods of time.

In some embodiments, the forecasting system 102 is further in communication with one or more worker scheduling circuits 112. The worker scheduling circuit can be configured to receive expected sales data corresponding to forecasted sales determined by the forecasting system based on the reservation data. Using the expected sales data, the worker scheduling circuit can adjust numbers of workers scheduled during at least a portion of one or more future periods of time for which the expected sales are forecasted. This can correspond to forecasted increases or decreases of sales of products at one or more shopping facilities. For example, in response to an expected increase in sales of several products at a particular shopping facility, the worker scheduling circuit can schedule additional workers to stock products, provide additional customer service, operate point-of-sale (POS) systems, and/or other such tasks. As a further example, when additional sales of several products are expected, the inventory system may order additional products to be received at a time in the future. The worker scheduling circuit can further schedule an additional one or more employees to be present to unload products when received in shipments at the shopping facility, and/or to move products to the sales floor to be available to customers for purchase.

The use of the reservation data further enables the forecasting system to increase or decrease inventory in advance to correspond to the expected future demand. In some instances, for example, the reservation data may include cancellation data of previous reservations. The forecasting system can use the cancellation data, which may be specific to a geographic region, in forecasting the expected sales that reduces previously forecasted expected sales as a function of the cancellation data. For example, a hurricane may be forecasted in a beach area. The hurricane would typically be accompanied by cancellations (which may include rescheduling to a different time) of hotel reservations, car reservations, airline flights, and/or other reservations, for geographic areas that are expected to be affected by the hurricane. As such, previously forecasted expected sales would likely be forecasted to reduce because of the increase in cancellation data.

The system may further use reservation data to identify events, such as annual expected events (e.g., graduations, sporting events, festivals, etc.), that may correspond to forecasted changes in demand and expected sales of at least some products in one or more geographic areas relevant to the event. For example, an annual event may take place in a particular areas, but an exact date may not be known. However, by evaluating reservation data, the forecasting system 102 can identify when the event is going to occur, and forecast demand accordingly. In some embodiments, the forecasting system 102 determines based on the reservation data a date of an expected event, and incorporates the event into an events schedule.

As another example, some or all of the reservation and/or travel data may be based on information and/or activity monitoring, which can be based, in whole or in part, upon sensor inputs from the Internet of Things 116. Again, the Internet of Things refers to the Internet-based inter-working of a wide variety of physical devices including but not limited to wearable or carriable devices, vehicles, buildings, and other items that are embedded with electronics, software, sensors, network connectivity, and sometimes actuators that enable these objects to collect and exchange data via the Internet. In particular, the Internet of Things allows people and objects pertaining to people to be sensed and corresponding information to be transferred to remote locations via intervening network infrastructure (e.g., network 108). Some experts estimate that the Internet of Things will consist of almost 50 billion such objects by 2020. Depending upon what sensors a person encounters, information can be available regarding a person's travels, lifestyle, calorie expenditure over time, diet, habits, interests and affinities, choices and assumed risks, and so forth.

Some embodiments accommodate either or both real-time or non-real time access to such information as well as either or both push and pull-based paradigms. By monitoring a person's behavior over time a general sense of that person's daily routine can be established (sometimes referred to herein as a routine experiential base state). As a very simple illustrative example, a routine experiential base state can include a typical daily event timeline for the person that represents typical locations that the person visits and/or typical activities in which the person engages. The timeline can indicate those activities that tend to be scheduled (such as the person's time at their place of employment or their time spent at their child's sports practices) as well as visits/activities that are normal for the person though not necessarily undertaken with strict observance to a corresponding schedule (such as visits to local stores, movie theaters, and the homes of nearby friends and relatives). Expected future changes and/or actual changes to that established routine can further be anticipated based on obtained information (e.g., reservation information, purchases, Internet search queries, etc.) and/or detected. These teachings are highly flexible in these regards and will accommodate a wide variety of "changes." Some illustrative examples include but are not limited to changes with respect to a person's travel schedule, destinations visited or time spent at a particular destination, the purchase and/or use of new and/or different products or services, a subscription to a new magazine, a new Rich Site Summary (RSS) feed or a subscription to a new blog, a new "friend" or "connection" on a social networking site, a new person, entity, or cause to follow on a Twitter-like social networking service, enrollment in an academic program, and so forth.

Upon forecasting and/or detecting a change some embodiments accommodate assessing whether the detected change constitutes a sufficient amount of data to warrant proceeding further with utilizing such data in forecasting at a corresponding one or more shopping facilities at one or more geographic locations. This assessment can comprise, for example, assessing whether a sufficient number (i.e., a predetermined number) of instances of data corresponding to this particular detected or forecasted change have occurred over some predetermined period of time. As another example, this assessment can comprise assessing whether the specific details of the detected or forecasted change are sufficient in quantity and/or quality to warrant further processing. For example, merely detecting that the person has searched for costs for reservations may not be enough information, in and of itself, to warrant further processing, in which case the information regarding the forecasted or detected change may be discarded or, in the alternative, cached for further consideration and use in conjunction or aggregation with other, later-detected data and/or changes. The data, when relevant, can be utilized in forecasting future sales relative to relevant locations and relevant products.

It will be appreciated that the forecasting system 100 can be viewed as a literal physical architecture or, if desired, as a logical construct. For example, these teachings can be enabled and operated in a highly centralized manner (as might be suggested when viewing the system as a physical construct) or, conversely, can be enabled and operated in a highly decentralized manner. In an illustrative example, the sales forecasting system 102 may be implemented through one or more central cloud servers, which communicate with the third party service 104, inventory system 106, database 110, worker scheduling system 112, and the aforementioned Internet of Things 116 via the network 108. Further, in some applications, some or all of the sales forecasting system 102 may be implemented though a distribution of process. For example, some of the rules may be implemented local on one or more of the Internet of Things 116, with resulting data provided to a more central sales forecasting system.

Figure 3:
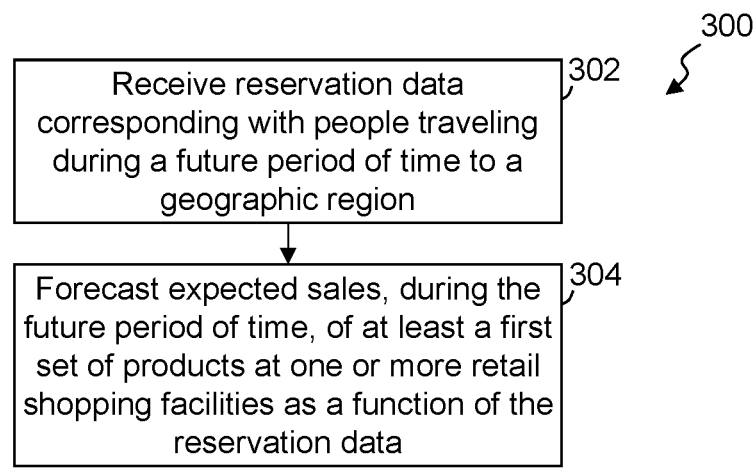
FIG. 3 illustrates a simplified flow diagram of an exemplary process of forecast expected and/or changes in sales based on reservation data, in accordance with some embodiments.

FIG. 3 illustrates a simplified flow diagram of an exemplary process 300 of forecast expected and/or changes in sales based on reservation data, in accordance with some embodiments. In step 302, reservation data corresponding to one or more future periods of time and to a geographic region is received one or more third party services unassociated with retail shopping facilities that are accessed over a distributed computer network, services associated with one or more retail shopping facilities for which demand is to be forecasted, and/or other sources. Typically, at least some of the reservation data corresponds with people traveling during the one or more future periods of time and the geographic region that is within a threshold distance from one or more retail shopping facilities where expected sales are being forecasted.

In step 304, expected sales are forecasted for at least a first set of products at the one or more retail shopping facilities as a function of the reservation data. The forecasted sales are further forecasted for the future period of time associated with the reservation data. Some embodiments determine the forecasted sales as a function of historic data and corresponding historic reservation data. Reservation data corresponding to a future period of time can be compared with historic reservation data. For example, historic reservation data for a similar time of the year and/or a similar period of time can be used to identify corresponding demands. Additionally or alternatively, historic reservation data that is consistent with levels of reservation data of the future period of time can be identified, and actual sales data during those historic periods of time can be considered in forecasting the future expected sales. In some embodiments, the reservation data that is received includes cancellation data of previous reservations. The expected sales forecasting can include reducing previously forecasted expected sales as a function of the cancellation data.

Some embodiments define a cluster of multiple retail shopping facilities that are within a predefined geographic region that includes multiple specific locations specifically associated with a subset of the reservation data. The expected sales can be forecasted for each of the multiple retail shopping facilities of the cluster as a function of the subset of the reservation data corresponding to the specific locations. Further, in some implementations, an end to a season can be predicted as a function of the reservation data. A change in inventory ordering can be implemented and/or caused based on the predicted end to the season.

Further, some embodiments maintain inventory information of available inventory of one or more retail shopping facilities. Orders can be adjusted of at least a set of products as a function of the expected sales of the set of products and the inventory information corresponding to the set of products. In some embodiments, inventory information is maintained of an inventory of products for sale at a particular retail shopping facility. A sales strategy can be modified of one or more products of a set of products based on the forecasted expected sales and the inventory information corresponding to the product. In some embodiments the expected sales is provided to a worker scheduling circuit 112. The system can adjust a numbers of workers scheduled during a portion of a future period of time for which the expected sales are forecasted. In some embodiments, the reservation data is evaluated to determine one or more dates of an expected event. The one or more dates and event can be incorporated into an events schedule.

In many instances, retail shopping facilities have relatively consistent sales of some goods over many times of the year. During some periods of time during the year for at least some retail shopping facilities, however, sales of at least some products increase and in some instances significantly increase. For example, some shopping facilities are in or near tourist destinations. As such, during times of the year when tourists are present sales of at least some products increase (e.g., sales of sunscreens, beach towels, beach toys, beach umbrellas increase during summer months near beach areas). Typically, food sales increase during periods where tourists are present. Tourists typically reserve hotel rooms, rental cars, purchase plane tickets, and other such reservations and/or purchases, and information about these reservations and/or purchases can be accessed by the forecasting system and used to forecast future expected sales, forecast changes in purchase patterns, and/or adjust forecasted expected sales. The forecasted sales can be used to adjust orders of products to ensure accurate quantities of products are available at the store. This can include considering a threshold margin of error (e.g., order 10% more than expected). The forecasted sales can further be used to schedule workers to ensure sufficient quantities of workers are available to stock products and support the customers. Additionally, reservation data can be used to start seeing patterns as people start making reservations. The closer to the period that is being forecasted, however, the more accurate the reservation data is likely to be to actual, and typically provides for more accurate forecasting.

Some embodiments provide systems, apparatuses, method and processes of forecasting product demand and/or expected sales at one or more retail shopping facilities. In some embodiments, a system includes a network transceiver coupled to communicate over a distributed computer network; a forecast control circuit; and a memory coupled to the forecast control circuit and storing computer instructions that when executed by the control circuit cause the control circuit to perform the steps of: receive, via the network transceiver from at least one third party service unassociated with retail shopping facilities and accessed over the distributed computer network, reservation data corresponding with people traveling during a future period of time to a geographic region that is within a threshold distance from a first retail shopping facility; and forecast expected sales, during the future period of time associated with the reservation data, of at least a first set of products at the first retail shopping facility as a function of the reservation data.

Some embodiments provide methods to forecast retail sales, comprising: by a forecast control circuit: receiving, from at least one third party service unassociated with retail shopping facilities and accessed over a distributed computer network, reservation data corresponding with people traveling during a future period of time to a geographic region that is within a threshold distance from a first retail shopping facility; and forecasting expected sales, during the future period of time associated with the reservation data, of at least a first set of products at the first retail shopping facility as a function of the reservation data.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system to forecast retail sales, comprising:
 a network transceiver coupled to communicate over a distributed computer network;
 a forecast control circuit; and
 a memory coupled to the forecast control circuit and storing computer instructions that when executed by the forecast control circuit cause the forecast control circuit to:
 receive reservation data corresponding with people traveling during a future period of time via the network transceiver from third party services that are separate from the forecast control circuit, unassociated with retail shopping facilities and accessed over the distributed computer network;
 receive, at the forecast control circuit via the distributed computer network, additional data from multiple different and geographically distributed Internet of Things;
 access a first set of rules to be applied to the reservation data;
 apply the first set of rules to the reservation data to identify a forecasted geographic region corresponding to a subset of the reservation data and identify at least a first retail shopping facility corresponding to the geographic region;
 access a second set of rules and apply the second set of rules to identify a portion of the additional data obtained from the Internet of Things that are associated with the geographic region corresponding to the first retail shopping facility;
 access a third set of rules and apply the third set of rules to the reservation data and the portion of the additional data to identify historic periods of time having similar historic reservation data to the subset of the reservation data corresponding to the geographic region;
 access a fourth set of rules applied in forecasting sales;
 apply the fourth set of rules to identify historic actual sales of at least a first set of products at the first retail shopping facility during the historic periods of time, and forecast expected sales, during the future period of time associated with the reservation data, of at least the first set of products, including at least expected sales of a first product, at the first retail shopping facility as a function of the subset of the reservation data, the portion of the additional data and the historic actual sales; and
 an inventory system communicatively coupled over the distributed computer network to access the forecasted expected sales during the future period of time and comprising memory storing inventory information of available inventory of the first retail shopping facility, wherein the inventory system receives the forecasted expected sales, accesses an inventory set of rules, applies the inventory set of rules and causes an adjustment to an order of the first product of the first set of products as a function of the expected sales of the first product and inventory information corresponding to the first product resulting in an adjustment of inventory of the first product at the first retail shopping facility corresponding to the future period of time.

2. The system of claim 1, wherein the forecast control circuit further defines a cluster of multiple retail shopping facilities that are within the geographic region that includes multiple specific locations specifically associated with the subset of the reservation data, and forecasts expected sales for each of the multiple retail shopping facilities of the cluster as a function of the subset of the reservation data corresponding to the multiple specific locations.

3. The system of claim 1, wherein the forecast control circuit further predicts an end to a season as a function of the reservation data and causes a change in inventory ordering based on the predicted end to the season.

4. The system of claim 1, wherein the inventory system is configured to adjust orders of at least the first set of products as a function of the forecasted expected sales of at least the first set of products and the inventory information corresponding to the first set of products thereby adjusting inventory of each product of the first set of products during the future period of time.

5. The system of claim 1, wherein the inventory system is configured to modify a sales strategy of at least the first product of the first set of products based on the expected sales of the first product and the inventory information corresponding to at least the first product.

6. The system of claim 1, further comprising: a worker scheduling circuit coupled with the forecast control circuit to receive the expected sales, wherein the worker scheduling circuit is configured to adjust numbers of workers scheduled during at least a portion of the future period of time associated with the forecasted expected sales.

7. The system of claim 1, wherein the reservation data comprises cancellation data of previous reservations, and the forecast control circuit in forecasting the expected sales reduces previously forecasted expected sales as a function of the cancellation data.

8. The system of claim 1, wherein the forecast control circuit is further configured to determine based on the reservation data a date of an expected event, and incorporate the event into an events schedule.

9. The system of claim 1, wherein the forecast control circuit in applying the third set of rules confirms one or more reservations of the reservation data based on the portion of the additional data received from one or more of the Internet of Things.

10. A method to forecast retail sales, comprising:
by a forecast control circuit:
receiving reservation data corresponding with people traveling during a future period of time from third party services that are separate from the forecast control circuit, unassociated with retail shopping facilities and accessed over a distributed computer network;
receiving, at the forecast control circuit via the distributed computer network, additional data from multiple different and geographically distributed Internet of Things;
accessing a first set of rules to be applied to the reservation data;
applying the first set of rules to the reservation data to identify a forecasted geographic region corresponding to a subset of the reservation data and identifying at least a first retail shopping facility corresponding to the geographic region;
accessing a second set of rules and applying the second set of rules to identify a portion of the additional data obtained from the Internet of Things that are associated with the geographic region corresponding to the first retail shopping facility;
accessing a third set of rules and applying the third set of rules to the reservation data and the portion of the additional data to identify historic periods of time having similar historic reservation data to the subset of the reservation data corresponding to the geographic region;
accessing a fourth set of rules applied in forecasting sales;
applying the fourth set of rules to identify historic actual sales of at least a first set of products at the first retail shopping facility during the historic periods of time, and forecasting expected sales, during the future period of time associated with the reservation data, of at least the first set of products, including at least expected sales of a first product, at the first retail shopping facility as a function of the subset of the reservation data and the historic actual sales; and
accessing an inventory set of rules, applying the inventory set of rules and adjusting an order of the first product of the first set of products as a function of the expected sales of the first product and inventory information corresponding to the first product resulting in an adjustment of inventory of the first product at the first retail shopping facility corresponding to the future period of time.

11. The method of claim 10, further comprises:
defining a cluster of multiple retail shopping facilities that are within the geographic region that includes multiple specific locations specifically associated with the subset of the reservation data; and
wherein the forecasting, comprises forecasting expected sales for each of the multiple retail shopping facilities of the cluster as a function of the subset of the reservation data corresponding to the multiple specific locations.

12. The method of claim 10, further comprising:
predicting an end to a season as a function of the reservation data; and
causing a change in inventory ordering based on the predicted end to the season.

13. The method of claim 10, further comprising:
maintaining the inventory information of available inventory of at least the first retail shopping facility; and
adjusting orders of at least the first set of products, including the adjusting the order of the first product, as a function of the forecasted expected sales of at least the first set of products and the inventory information corresponding to the first set of products thereby adjusting inventory of each product of the first set of products during the future period of time.

14. The method of claim 10, further comprising:
maintaining inventory information of an inventory of products for sale at the first retail shopping facility; and
modifying a sales strategy of at least the first product of the first set of products based on the expected sales of the first product and the inventory information corresponding to at least the first product.

15. The method of claim 10, further comprising:
receiving, at a worker scheduling circuit, the expected sales; and
adjusting numbers of workers scheduled during a portion of the future period of time associated with the forecasted expected sales.

16. The method of claim 10, wherein the receiving the reservation data comprises receiving cancellation data of previous reservations; and
the forecasting the expected sales comprises reducing previously forecasted expected sales as a function of the cancellation data.

17. The method of claim 10, further comprising:
determining based on the reservation data a date of an expected event; and
incorporating the event into an events schedule.

* * * * *